(12) United States Patent
Chi et al.

(10) Patent No.: US 10,148,775 B2
(45) Date of Patent: Dec. 4, 2018

(54) IDENTIFYING ACTIONS FOR A USER OF A DIGITAL MAGAZINE SERVER TO PERFORM BASED ON ACTIONS PREVIOUSLY PERFORMED BY THE USER

(71) Applicant: Flipboard, Inc., Palo Alto, CA (US)

(72) Inventors: Sang Chi, Burlingame, CA (US); Guy Hawkins, Palo Alto, CA (US); Guangle Fan, San Jose, CA (US)

(73) Assignee: Flipboard, Inc., Palo Alto, CA (US)

( * ) Notice: Subject to any disclaimer, the term of this patent is extended or adjusted under 35 U.S.C. 154(b) by 372 days.

(21) Appl. No.: 14/852,439

(22) Filed: Sep. 11, 2015

(65) Prior Publication Data

US 2017/0078413 A1   Mar. 16, 2017

(51) Int. Cl.
| | |
|---|---|
| *H04L 29/08* | (2006.01) |
| *G06F 9/451* | (2018.01) |
| *G06Q 30/06* | (2012.01) |

(52) U.S. Cl.
CPC ............ *H04L 67/22* (2013.01); *G06F 9/453* (2018.02); *G06Q 30/0631* (2013.01); *H04L 67/306* (2013.01)

(58) Field of Classification Search
CPC ..................................................... G06F 3/048
See application file for complete search history.

(56) References Cited

U.S. PATENT DOCUMENTS

| | | | | |
|---|---|---|---|---|
| 9,665,243 | B2 * | 5/2017 | Ragothaman | H04L 67/10 |
| 2003/0225550 | A1 * | 12/2003 | Hiller | G06F 11/3476 |
| | | | | 702/186 |
| 2005/0144246 | A1 * | 6/2005 | Malik | G06Q 10/107 |
| | | | | 709/206 |
| 2010/0318470 | A1 * | 12/2010 | Meinel | G06Q 10/00 |
| | | | | 705/300 |
| 2012/0069131 | A1 * | 3/2012 | Abelow | G06Q 10/067 |
| | | | | 348/14.01 |
| 2012/0253876 | A1 * | 10/2012 | Hersch | G06Q 10/06 |
| | | | | 705/7.17 |
| 2015/0071181 | A1 * | 3/2015 | Nasir | H04W 28/20 |
| | | | | 370/329 |
| 2015/0269488 | A1 * | 9/2015 | Galai | H04L 67/22 |
| | | | | 706/11 |
| 2015/0276421 | A1 * | 10/2015 | Beaurepaire | H04W 4/027 |
| | | | | 701/400 |
| 2015/0281156 | A1 * | 10/2015 | Beausoleil | H04L 51/14 |
| | | | | 709/206 |
| 2015/0326679 | A1 * | 11/2015 | Lin | H04L 67/12 |
| | | | | 709/204 |

(Continued)

*Primary Examiner* — Ryan F Pitaro
(74) *Attorney, Agent, or Firm* — Fenwick & West LLP

(57) ABSTRACT

An application associated with a digital magazine server receives actions from a user of the digital magazine server with content provided by the application. Additionally, the application obtains rules including suggested actions for the user to perform that are associated with actions previously performed by the user. As the user interacts with the application, the application captures information describing actions performed by the user and compares the actions performed by the user to the rules. If the application identifies a rule including information describing actions previously performed by the user that match captured actions, the application presents information identifying the suggested action in the identified rule to the user.

12 Claims, 4 Drawing Sheets

(56) References Cited

U.S. PATENT DOCUMENTS

2016/0062607 A1\* 3/2016 Lunceford ............ G06F 3/0482
  715/845
2017/0228635 A1\* 8/2017 Diev .................... G06N 3/0481

\* cited by examiner

|  | Desired Action | Performed Action | Performed Action | Performed Action |
|---|---|---|---|---|
| 500A | Share Content Item | View Specific Content Item Within Prior 2 Days | View Specific Content Item Within Prior Day | |
| 500B | Provide Comment | Provide Content Item | Indicate Preference for Additional Content Item | Share Other Content Item |

IDENTIFYING ACTIONS FOR A USER OF A DIGITAL MAGAZINE SERVER TO PERFORM BASED ON ACTIONS PREVIOUSLY PERFORMED BY THE USER

BACKGROUND

This invention relates generally to user interaction with a digital magazine application executing on a client device, and more specifically to identifying actions desired by a digital magazine server to a user based on prior user interaction with the digital magazine application.

An application executing on a client device obtains content from an online system and presents the content to a user of the client device. The online system may select content for the user based on information associated with the user by the online system, allowing the application to present the user with content personalized for the user. In addition to presenting content to the user, the application receives actions by the user with content presented by the application. The application may communicate information describing the actions to the online system, which may subsequently select content additional content for the user based on the actions by the user with the presented content.

The user may perform a variety of actions with the application, with different actions providing the online system with information that may be used to select content for the user or for other users. Different actions with the application provide different information about the user to the online system. For example, different actions performed by the user provide the online system with different amounts of information identifying the user's interest in content. Hence, actions performed by the user via the application that are identified to the online system allow the online system to provide the user with content more likely to be of interest to the user.

However, a user may view content via the application while having an incomplete understanding of the actions that the user may perform. This may reduce the amount of information provided to the online system from the user performing a limited set of actions with the application, which reduces the likelihood of the online system providing the user with content with which the user is likely to interact. Additionally, a limited awareness of the actions capable of being performed with the application may reduce overall user interaction with the application, decreasing interaction by the user with the online system.

SUMMARY

A digital magazine server retrieves content from one or more sources and generates a personalized, customizable digital magazine for a user based on the retrieved content. The generated digital magazine is retrieved by a digital magazine application, also referred to as an "application," executing on a client device (such as a mobile communication device, tablet, computer, or any other suitable computing system). The application presents the digital magazine to the user and receives actions from the user with content presented by the application. Actions by the user with the application may be communicated to the digital magazine server, which selects content for the digital magazine based on the actions performed by the user. For example, based on selections made by the user via the application, the digital magazine server generates a digital magazine including one or more sections including content items retrieved from a number of sources and personalized for the user. The generated digital magazine allows the user to more easily consume content that interests and inspires the user by presenting content items in an easily navigable interface via a client device.

A user may perform a variety of actions with the application, with different actions providing the digital magazine server with information that may be used by the digital magazine server to select content for the user or to select content for other users. Example actions include: viewing a content item presented by the application, accessing a content item presented by the application, sharing a content item presented by the application with another user, and providing a content item to the digital magazine server via the application. However, different actions with the application provide different information about the user to the digital magazine server. For example, a user sharing a content item presented via the application with other users provides a stronger indication to the digital magazine server that the user is interested in the content item, allowing the digital magazine server to better identify content items likely to be of interest to the user.

A user may view content via the application while being unaware of actions that the user may perform with the application, limiting the information about the user captured by the digital magazine server. To encourage users to perform various interactions with the application, the application obtains a set of rules identifying suggested actions for a user interacting with the application to perform. The set of rules may be included in the application when it is installed on a client device, may be obtained from the digital magazine server, or may be obtained from any suitable source. Each rule includes a suggested action and information describing actions performed by the user, such as actions involving the application. The information describing actions performed by the user included in a rule are conditions associated with identifying the suggested action included in the rule to the user. For example, information describing actions performed by the user identifies one or more actions and times when the identified actions were performed. Example actions include viewing a content item presented by the application, providing a comment on a content item presented by the application, providing a content item to the digital magazine server via the application, and sharing a content item with another user of the digital magazine server via the application. Additionally, a rule may associate characteristics with an action identified by the rule to more specifically identify conditions for identifying the suggested action included in the rule. For example, a rule associates a time, a time interval (e.g., a time interval from a current time), a frequency with which an action was performed, or a content item with one or more actions identified in the rule. Additionally, a rule may include one or more characteristics of the user, along with a suggested action and information describing actions performed by the user. The characteristics of the user may be used along with the information describing actions performed by the user to specify conditions for identifying the suggested action to the user. Example characteristics of the user include: demographic information (e.g., location, age range, gender, interests, etc.), connections between the user and additional users of the digital magazine server, a type of client device associated with the user, a type of connection between a client device on which the application is executing and the digital magazine server, a version of the application executing on the client device associated with the user, or any other suitable information.

As the application presents content to the user, the application captures and stores information describing actions performed by the user with the application. For example, information captured and stored by the application identifies an action performed by the user and a time when the user performed the action. Additionally, the captured information may include an identifier of a content item presented by the application with which the user performed an action. The application may generate additional characteristics for storage based on the captured information and previously stored information in some embodiments. For example, based on an action identified by the captured information, a time associated with the action, and stored times associated with previously stored information identifying the action, the application generates a frequency with which the user performs the action and stores the frequency in association with the action identified by the captured information.

The application compares the stored information describing actions performed by the user with the application to the obtained set of rules to identify one or more rules including at least a threshold amount of information describing actions performed by the user matching at least a threshold amount of information describing actions performed by the user included in one or more of the rules. For example, the application identifies a rule including information describing actions performed by the user that matches information stored by the application describing actions performed by the user with the application. If a rule associates characteristics with one or more actions included in the rule, the application identifies the rule if at least a threshold number of characteristics associated with stored information describing an action performed by the user with the application matching an action identified by the rule match characteristics associated with the action performed by the user with the application. For example, if a rule includes an action of sharing a content item within 2 days of a current time and the stored information identifies an action where the user shared the content item with another user, the application identifies the rule if the user sharing the content item identified by the stored information is associated with a time within 2 days of the current time, but not if the user shared the content item greater than 2 days from the current time.

In various embodiments, the application retrieves stored characteristics associated with the user from the application or from the digital magazine server when identifying one or more rules including at least a threshold amount of information describing actions performed by the user matching at least a threshold amount of information describing actions performed by the user included in one or more of the rules. When rules include characteristics of the user and information describing actions performed by the user, the application compares the characteristics of the user as well as the stored information describing actions performed by the user with the application with information describing actions performed by the user and characteristics of the user included in various rules. Based on the comparison, the application identifies one or more rules including at least a threshold amount of information describing actions performed by the user and characteristics associated with the user matching at least a set of the stored information describing actions performed by the user with the application and the stored characteristics associated with the user.

The application presents information describing a suggested action included in the identified rule to the user. In various embodiments, the application presents the user with a prompt identifying the suggested action and that may also include suggestions or recommendations for performing the suggested action. For example, the prompt identifies the suggested action and includes one or more advantages to the user caused by performing the suggested action. Information describing the suggested action included in the identified rule may be retrieved from the identified rule itself, or the application may retrieve additional information and combine the additional information with the suggested action included in the identified rule to generate the information describing the suggested action included in the identified rule presented to the user. Presenting information identifying a suggested action identified based on the user's prior actions with the application allows the application to identify actions to the user causing the user to increase interaction with the application. This increased interaction may be communicated to the digital magazine server, allowing the digital magazine server to provide more relevant content to the user based on the user's actions with the application.

BRIEF DESCRIPTION OF THE DRAWINGS

FIG. 5 is an example of rules identifying suggested actions associated with information describing actions previously performed by a user of a digital magazine server, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital magazine server generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
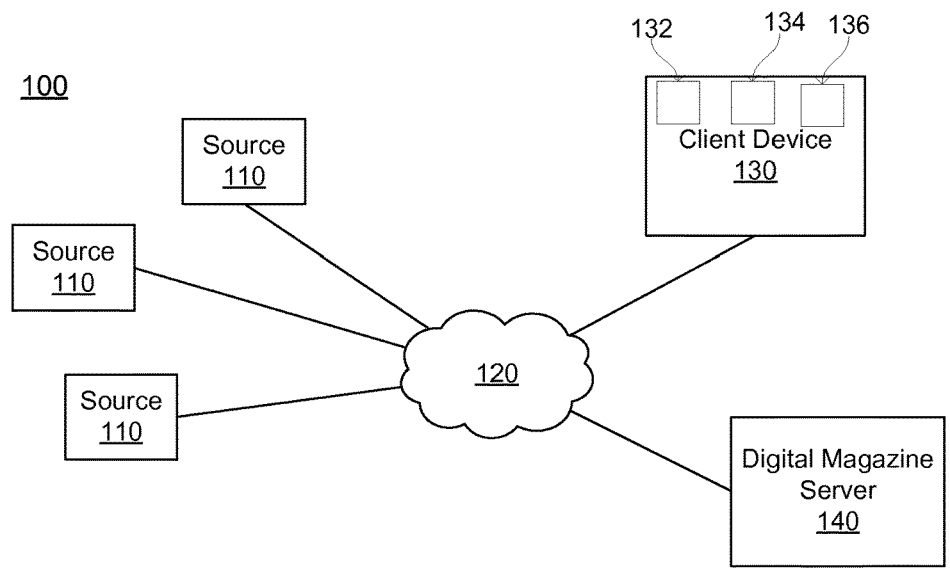
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The client device 130 executes an application 136 associated with the digital magazine server 140 that receives content form the digital magazine server 140 and presents the received content to a user associated with the client device 130. Additionally, the user performs various actions with the application 136, such as actions with content from the digital magazine server 140 presented by the application 136. For example, the application 136 presents various content items received from the digital magazine server 140 and receives actions from the user with one or more of the content items. Example actions by bye user with content items presented by the application 136 include: accessing a content item, viewing a content item, sharing a content item with another user of the digital magazine server 140, saving a content item to the client device 130, providing a comment associated with a content item, and providing a content item to the digital magazine server 140.

To encourage the user to perform certain interactions, the application 136 obtains a set of rules, with each rule in the set identifying a suggested action for a user to perform via the application and information describing one or more actions previously performed by the user. One or more rules in the set may also include characteristics of the user. As the user interacts with the application 136, the application 136 captures and stores information describing the user's interactions. The application 136 compares the stored information to the set of rules to identify one or more rules that include information describing one or more actions previously performed by the user matching at least a set of the stored information and presents a suggested action included in the identified rule to the user. For example, the application 136 presents a prompt to perform the suggested action included in the identified rule that identifies the suggested action and one or more advantages to the user if the suggested action is performed. Selection and presentation of a suggested action to a user from a set of rules is further described below in conjunction with FIGS. 4 and 5.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
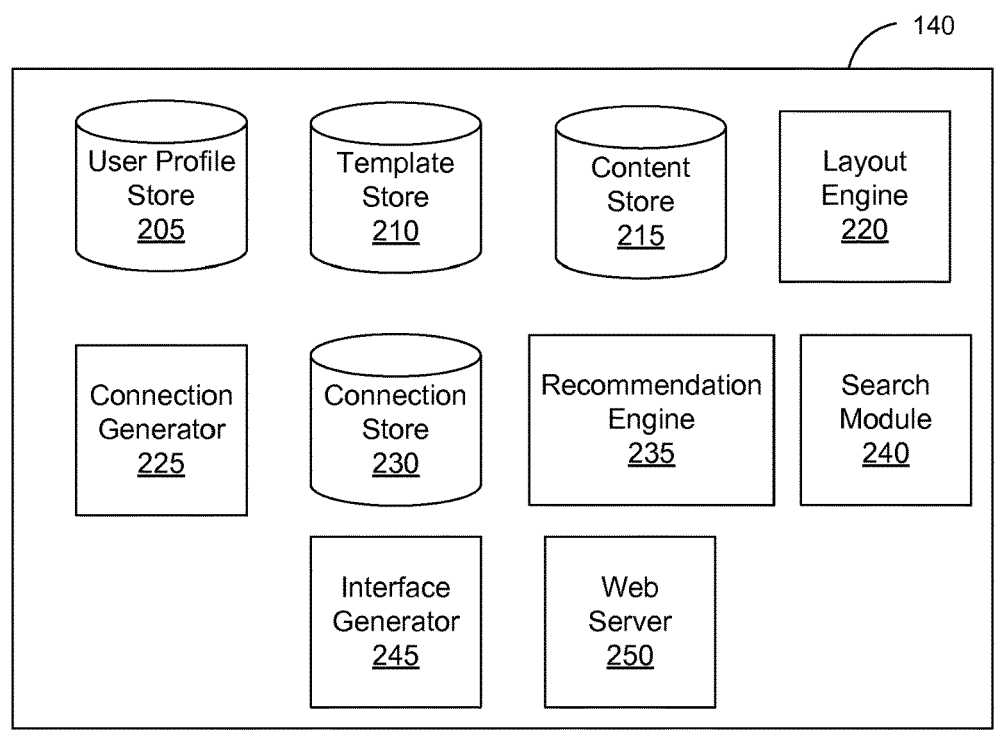
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding digital magazine server user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 110 within a threshold time of a current time. Examples of content items stored by the content store 215 include a page post, a status update, an image, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and the application 136 executing on a client device 130. For example, the digital magazine server 140 provides a set of rules each identifying suggested actions for a user to perform and information describing actions previously performed by the user to the application 136. As the user interacts with the application 136, the application 136 identifies one or more rules including at least a threshold amount of information describing actions previously performed by the user matching actions performed by the user with the application. A suggested action included in an identified rule is presented to the user by the application 136 to entice the user to perform the suggested action via the application 136.

Page Templates

Figure 3:
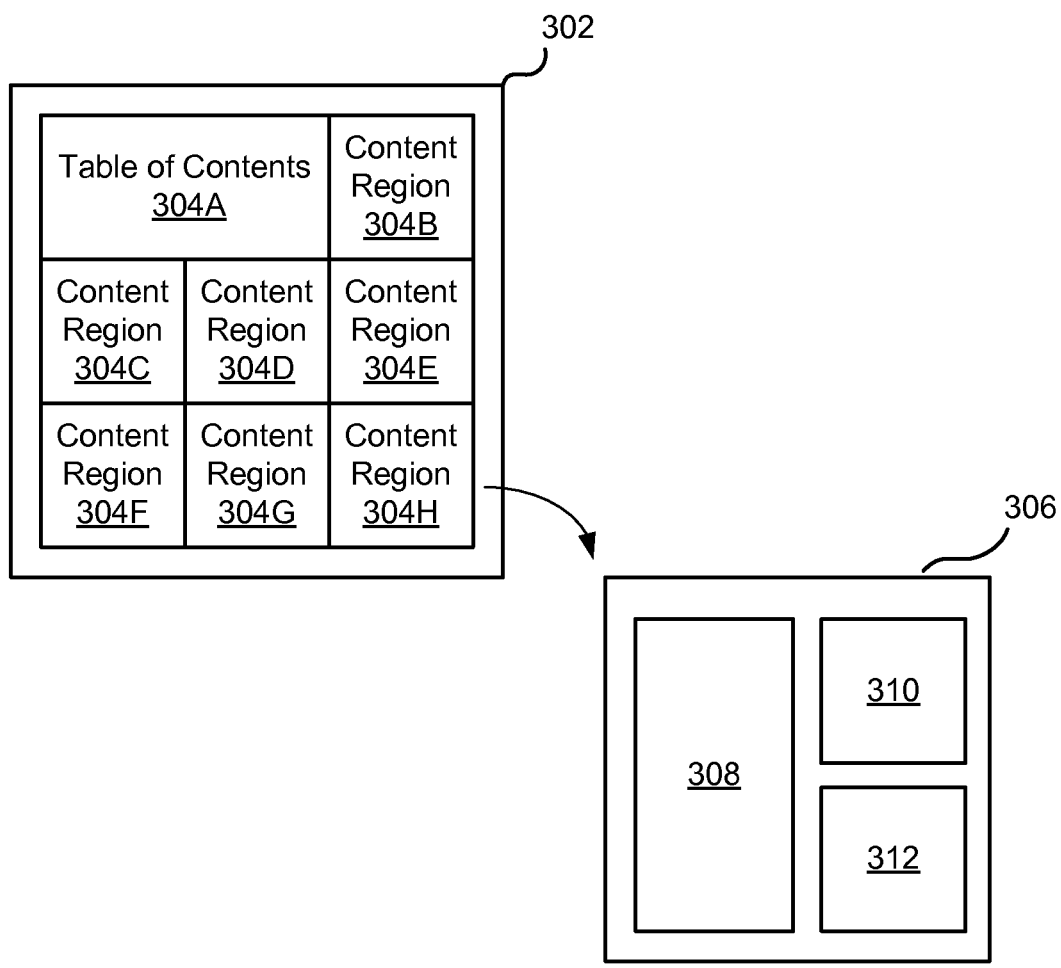
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
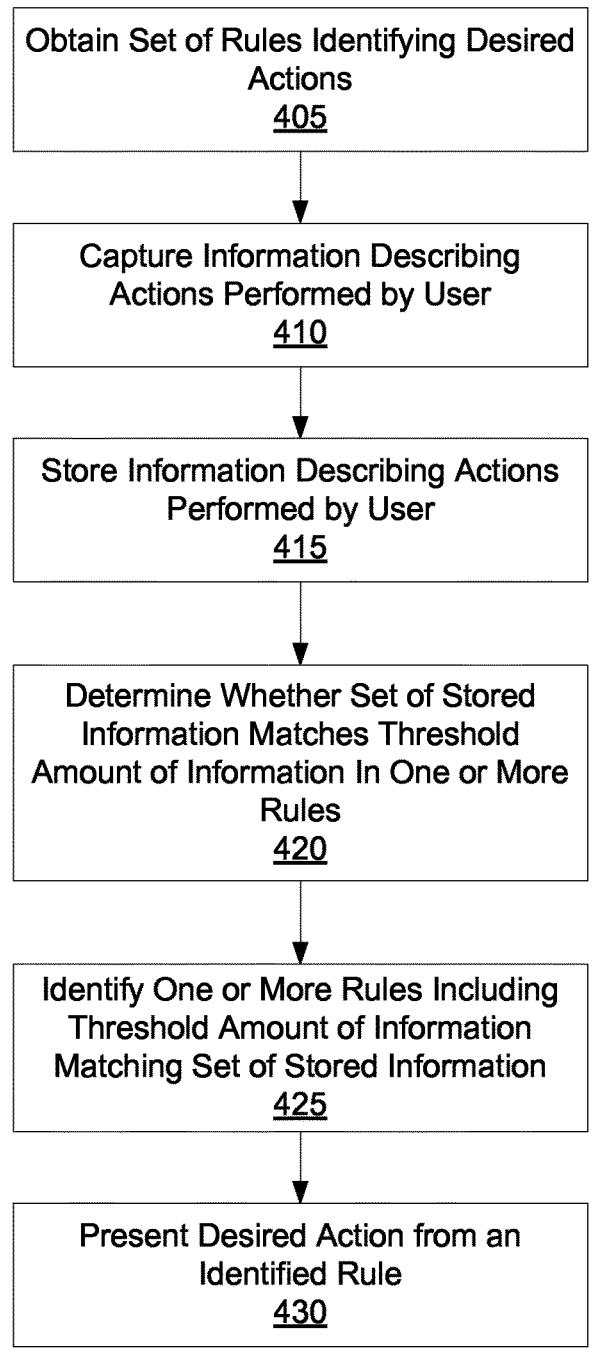
FIG. 4 is a flowchart of a method for identifying a suggested action for a user of a digital magazine server to perform based on actions previously performed by the user, in accordance with an embodiment of the invention.

Identifying Suggested Actions to a Digital Magazine Server User Based on the User's Prior Actions FIG. 4 shows one embodiment of a method for identifying suggested actions to a user of a digital magazine server 140 based on actions performed by the user. In other embodiments, the method includes different or additional steps than those described in conjunction with FIG. 4. Additionally, in some embodiments, the method may perform steps in different orders than the order described in conjunction with FIG. 4.

An application 136 associated with a digital magazine server 140 and executing on a client device 130 obtains 405 a set of rules identifying suggested actions for a user interacting with the application 136 to perform. Each rule includes a suggested action and information describing actions performed by the user, such as actions involving the application 136. A suggested action may be any action capable of being performed by the user with the application 136. The information describing actions performed by the user included in a rule are conditions associated with identifying the suggested action included in the rule to the user. In various embodiments, information describing actions performed by the user identifies one or more actions and times when the identified actions were performed. Example actions include viewing a content item presented by the application 136, providing a comment on a content item presented by the application 136, providing a content item to the digital magazine server 140 via the application 136, and sharing a content item with another user of the digital magazine server 140 via the application 136. However, any suitable action capable of being performed by a user may be included in a rule. A rule may associate characteristics with an action identified by the rule to more specifically identify conditions for identifying the suggested action included in the rule. For example, a rule associates a time or time interval (e.g., a time interval from a current time) with an action identified in the rule or identifies a frequency with which the user performed the action identified in the rule. Certain rules may associate a particular content item with an action identified by the rule, such as associating an identifier of a content item with an action identified in the rule to identify performance of the action with the content item corresponding to the identifier. However, any suitable characteristic may be associated with actions performed by the user and identified by a rule.

In some embodiments, a rule includes one or more characteristics of the user, along with a suggested action and information describing actions performed by the user. The characteristics of the user may be used along with the information describing actions performed by the user to specify conditions for identifying the suggested action to the user. Example characteristics of the user include: demographic information (e.g., location, age range, gender, interests, etc.), connections between the user and additional users of the digital magazine server 140, a type of client device 130 associated with the user, a type of connection between a client device 130 on which the application 136 is executing and the digital magazine server 140, a version of the application 136 executing on the client device 130 associated with the user, or any other suitable information.

Referring to FIG. 5, example of rules identifying suggested actions associated with information describing actions previously performed by a user of the digital magazine server 140 are shown. In the example of FIG. 5, rules 500A, 500B (also referred to individually and collectively using reference number 500) each include a suggested action 510 and one or more previously performed actions 520 associated with the suggested action 510. As shown in FIG. 5, characteristics may be associated with various performed actions 520 included in a rule 500. For example, rule 500A includes a suggested action 510 of sharing a specific content item within 2 days of a current day and viewing the specific content item within a day of the prior day. Different logical relationships (e.g., AND, OR, etc.) between the previously performed actions 520 included in a rule 500. As another example, rule 500B includes a suggested action 510 of providing a comment on a content item that is associated with performed actions 520 of providing a content item to the digital magazine server 140, indicating a preference for an additional content item, and sharing another content item. Any number of rules 500 may be obtained 305 by the application 136, with any number or combination of performed actions 520 associated with suggested actions 510 included in various rules.

Turning again to FIG. 4 As the application 136 presents content from the digital magazine server 140 or from the client device itself 110, the application 136 captures 410 information describing actions performed by the user with the application 136 and stores 415 the captured information. Information captured 410 by the application 136 identifies an action performed by the user and a time when the user performed the action. Additionally, the captured information may include an identifier of a content item presented by the application 136 with which the user performed an action. When storing 415 the captured information, the application 136 may generate additional characteristics for storage based on the captured information and previously stored information. For example, based on an action identified by the captured information, a time associated with the action, and stored times associated with previously stored information identifying the action, the application 136 generates a frequency with which the user performs the action and stores 415 the frequency in association with the action identified by the captured information. Other suitable additional characteristics may be generated by the application 136 and stored 415 based on the captured information and previously stored information 415. In various embodiments, the application 136 maintains a table associated with the user that identifies various actions performed by the user with the application 136 and associates different information with each action performed by the user with the application 136 (e.g., a frequency with which the user performed an action, times when the user performed the action, or other suitable information).

The application 136 compares the stored information describing actions performed by the user with the application 136 to the obtained set of rules to determine 420 whether at least a set of the stored information matches at least a threshold amount of information describing actions performed by the user included in one or more of the rules. Based on the comparison, the application 136 identifies 425 one or more rules from the set of rules that includes at least a threshold amount of information describing actions performed by the user that matches a set of the stored information describing actions performed by the user with the application 136. For example, the application identifies 425 a rule including information describing actions performed by the user that matches information stored 415 by the application 136 describing actions performed by the user with the application 136. If a rule associates characteristics with one or more actions included in the rule, the application 136 identifies 425 the rule if at least a threshold number of characteristics associated with stored information describing an action performed by the user with the application 136 matching an action identified by the rule match characteristics associated with the action performed by the user with the application 136; however, the application 136 does not identify 425 the rule if less than the threshold number of characteristics associated with stored information describing an action performed by the user with the application 136 matching an action identified by the rule match characteristics associated with the action performed by the user with the application 136. For example, if a rule includes an action of commenting on a content item within 4 days of a current time and the stored information identifies an action where the user commented on a content item, the application 136 identifies 425 the rule if the user commenting on the content item identified by the stored information is associated with a time within 4 days of the current time; however, if the time associated with the user commenting on the content item identified by the stored information is greater than 4 days from the current time, the application 136 does not identify 425 the rule.

In various embodiments, the application 136 retrieves stored characteristics associated with the user from the application 136 or from the digital magazine server 140 when determining 420 whether at least a set of the stored information matches at least a threshold amount of information describing actions performed by the user included in one or more of the rules. The application 136 compares the characteristics of the user as well as the stored information describing actions performed by the user with the application 136 with information describing actions performed by the user included in various rules. Based on the comparison, the application 136 identifies one or more rules including at least a threshold amount of information describing actions performed by the user that matches at least a set of the stored information describing actions performed by the user with the application 136 and the stored characteristics associated with the user. This allows the application 136 to account for characteristics associated with the user when identifying 425 one or more rules. Including user characteristics in various rules allows the rules to be more specifically directed to certain groups of users, such as users having specific demographic information or users who have established connections with specific additional users of the digital magazine server 140.

In some embodiments, the application 136 waits a specified time delay between capturing 410 and storing 415 information describing interactions performed by the user with the application 136 and comparing the stored information to information included in various rules that describes actions performed by the user. If the application 136 waits the specified time delay, the application 136 compares a suggested action included in the identified rule to the stored information describing interactions performed by the user, and identifies 425 an alternative rule if the suggested action matches an action included in the stored information describing interactions performed by the user with the application 136. This prevents the application 136 from subsequently identifying a suggested action to the user that is an action previously performed by the user.

The application 136 presents 430 information describing a suggested action included in the identified rule to the user. In various embodiments, the application 136 presents 430 the user with a prompt identifying the suggested action that may also include suggestions or recommendations for performing the suggested action. For example, the prompt identifies the suggested action and includes one or more advantages to the user caused by performing the suggested action. Information describing the suggested action included in the identified rule may be retrieved from the identified rule itself, or the application 136 may retrieve additional information and combine the additional information with the suggested action included in the identified rule to generate the information describing the suggested action included in the identified rule presented 430 to the user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    obtaining a set of rules, each rule including a suggested action by a user and information describing actions performed by the user;
    capturing information describing actions performed by the user with an application associated with a digital magazine server and executing on a client device, captured information describing an action performed by the user identifying the action and a time when the action was performed;
    storing the captured information describing actions performed by the user with the application associated with the digital magazine server and executing on the client device;
    comparing the stored captured information describing actions performed by the user with the application associated with the digital magazine server and executing on the client device with information describing actions performed by the user in various rules after waiting a time delay after storing the captured information;
    identifying the rule including at least the threshold amount of information describing actions performed by the user matching at least the set of the captured information describing actions performed by the user with the application associated with the digital magazine server and executing on the client device based on the comparison;
    comparing a suggested action included in the identified rule to stored captured information describing actions performed by the user with the application associated with the digital magazine server and executing on the client device performed during the time delay;
    identifying an alternative rule including at least the threshold amount of information describing actions performed by the user matching at least the set of the captured information describing actions performed by the user with the application associated with the digital magazine server and executing on the client device in response to the suggested action included in the identified rule matching to stored captured information describing actions performed by the user with the application associated with the digital magazine server and executing on the client device performed during the time delay; and presenting a prompt to the user identifying the suggested action included in the identified rule and identifying one or more advantages to the user from performing the suggested action included in the identified rule via the application associated with the digital magazine server executing on the client device.

2. The method of claim 1, wherein one or more rules in the set of rules include characteristics of the user.

3. The method of claim 2, wherein identifying the rule including at least the threshold amount of information describing actions performed by the user matching at least the set of the captured information describing actions performed by the user with the application associated with the digital magazine server and executing on the client device comprises:

retrieving characteristics associated with the user by the digital magazine server;

identifying a rule including at least the threshold amount of information describing actions performed by the user matching at least the set of the captured information describing actions performed by the user with the application associated with the digital magazine server and executing on the client device and including at least a threshold amount of characteristics of the user matching the retrieved characteristics associated with the user by the digital magazine server.

4. The method of claim 2, wherein characteristics of the user are selected from a group consisting of: demographic information of the user, connections between the user and additional users of the digital magazine server, a type of client device associated with the user, a type of connection between the client device and the digital magazine server, a version of the application, and any combination thereof.

5. The method of claim 1, wherein storing the captured information describing actions performed by the user with the application associated with the digital magazine server and executing on the client device comprises:

generating one or more characteristics for storage in association with the captured information describing actions performed by the user with the application associated with the digital magazine server and executing on the client device based on the captured information and previously stored information.

6. The method of claim 5, wherein a characteristic comprises a frequency with which the user performed an action with the application associated with the digital magazine server and executing on the client device.

7. The method of claim 1, wherein the suggested action is selected from a group consisting of: viewing a content item presented by the application, accessing the content item presented by the application, sharing the content item presented by the application with another user, providing the content item to the digital magazine server via the application, and any combination thereof.

8. The method of claim 1, wherein presenting the prompt to the user identifying the suggested action included in the identified rule and identifying one or more advantages to the user from performing the suggested action included in the identified rule via the application associated with the digital magazine server executing on the client device comprises:

presenting the prompt to the user identifying a suggested action included in the alternative rule and identifying one or more advantages to the user from performing the suggested action included in the alternative rule via the application associated with the digital magazine server executing on the client device in response to identifying the alternative rule.

9. A method comprising:

obtaining a set of rules, each rule including a suggested action by a user and information describing actions performed by the user;

capturing information describing actions performed by the user with an application associated with a digital magazine server and executing on a client device;

storing the captured information describing actions performed by the user with the application associated with the digital magazine server and executing on the client device;

comparing the stored captured information describing actions performed by the user with the application associated with the digital magazine server and executing on the client device with information describing actions performed by the user in various rules after waiting a time delay after storing the captured information;

identifying the rule including at least the threshold amount of information describing actions performed by the user matching at least the set of the captured information describing actions performed by the user with the application associated with the digital magazine server and executing on the client device based on the comparison;

comparing a suggested action included in the identified rule to stored captured information describing actions performed by the user with the application associated with the digital magazine server and executing on the client device performed during the time delay;

identifying an alternative rule including at least the threshold amount of information describing actions performed by the user matching at least the set of the captured information describing actions performed by the user with the application associated with the digital magazine server and executing on the client device in response to the suggested action included in the identified rule matching to stored captured information describing actions performed by the user with the application associated with the digital magazine server and executing on the client device performed during the time delay and presenting a prompt to the user identifying the suggested action included in the identified rule and identifying one or more advantages to the user from performing the suggested action included in the identified rule via the application associated with the digital magazine server executing on the client device.

10. The method of claim 9, wherein one or more rules in the set of rules include characteristics of the user.

11. The method of claim 10, wherein identifying the rule including at least the threshold amount of information describing actions performed by the user matching at least the set of the captured information describing actions performed by the user with the application associated with the digital magazine server and executing on the client device comprises:

retrieving characteristics associated with the user by the digital magazine server;

identifying a rule including at least the threshold amount of information describing actions performed by the user matching at least the set of the captured information describing actions performed by the user with the application associated with the digital magazine server and executing on the client device and including at least a threshold amount of characteristics of the user matching the retrieved characteristics associated with the user by the digital magazine server.

12. The method of claim 9, wherein presenting the prompt to the user identifying the suggested action included in the identified rule and identifying one or more advantages to the user from performing the suggested action included in the identified rule via the application associated with the digital magazine server executing on the client device comprises:

presenting the prompt to the user identifying a suggested action included in the alternative rule and identifying one or more advantages to the user from performing the suggested action included in the alternative rule via the application associated with the digital magazine server executing on the client device in response to identifying the alternative rule.

\* \* \* \* \*